United States Patent [19]

Tada et al.

[11] Patent Number: 4,666,782
[45] Date of Patent: May 19, 1987

[54] VULCANIZED RUBBER ARTICLE

[75] Inventors: Hiroshi Tada, Kurume; Masanari Kido, Ohkawa; Hidehiko Masunaga, Kurume; Toshiaki Iwamoto, Suita; Tuneyoshi Ishimoto, Ashiya; M. Matsui, Moriyama, all of Japan

[73] Assignees: Kuraray Co., Ltd., Okayama; Moon Star Chemical Corporation, Fukuoka, both of Japan

[21] Appl. No.: 759,349

[22] Filed: Jul. 26, 1985

[30] Foreign Application Priority Data

Aug. 9, 1984 [JP] Japan .................. 59-167616

[51] Int. Cl.$^4$ .................. B32B 25/08; B32B 27/40
[52] U.S. Cl. .................. 428/423.9; 428/424.7; 428/424.8
[58] Field of Search .................. 428/423.9, 424.8, 424.7

[56] References Cited

U.S. PATENT DOCUMENTS

| | | | |
|---|---|---|---|
| 3,382,138 | 5/1968 | Barth | 428/423.9 |
| 4,136,219 | 1/1979 | Odam et al. | 428/423.9 |
| 4,233,359 | 11/1980 | Mimura et al. | 428/423.5 |
| 4,515,852 | 5/1985 | Katabe et al. | 428/423.3 |
| 4,552,816 | 11/1985 | Spahic et al. | 428/423.9 |

FOREIGN PATENT DOCUMENTS

| | | |
|---|---|---|
| 3698 | 2/1970 | Japan . |
| 8241 | 1/1981 | Japan . |
| 16801 | 4/1982 | Japan . |

Primary Examiner—William J. Van Balen
Attorney, Agent, or Firm—Wegner & Bretschneider

[57] ABSTRACT

A vulcanized rubber article which comprises a vulcanized rubber layer, and non-porous and homogenized thermoplastic polyurethane layer(s) having an average thickness of 0.02–1.0 mm on at least one surface of the vulcanized rubber layer, said polyurethane layer(s) being integrally fused to the vulcanized rubber and the peeling strength between the rubber layer and the polyurethane layer being at least 1.2 kg/cm, and a process for production thereof. The article simplifies the process for production of shoes and makes the control of the process of production readily, and provide a final production having an excellent flexibility, flexing resistance, friction resistance, oil resistance, cleavage resistance against ozone and the like.

2 Claims, 4 Drawing Figures

VULCANIZED RUBBER ARTICLE

FIELD OF THE INVENTION

The present invention relates to a vulcanized rubber article. More particularly, the present invention relates to a vulcanized rubber article which has an excellent adhesion to a semihard polyurethane, a synthetic resin article, a leather article and the like and is useful as a substrate of a shoe sole to the ground.

DESCRIPTION OF THE PRIOR ART

For applying a vulcanized rubber to a sole, it has previously been carried out that a shoe upper material produced in advance was adhered with adhesive or fused by heat to a vulcanized rubber sole. However, in such shoes, the adhesion of a vulcanized rubber to a shoe upper material is remarkably inferior. Therefore, as an improved method of an adhesion of a vulcanized rubber to a shoe upper material, it has been proposed, for example, that a shoe upper material is disposed into a desired mold, and then a polyurethane composition solution containing a foaming agent is poured thereto to foam the material, whereby simultaneously with a molding of a sole, a shoe upper material is integrated with a sole (see Japanese Patent Publication Nos. 3698/1970 and 16801/1982). In such a known method, to impart an abrasion resistance to a contacting surface to ground, i.e. to a toe shoe and a heal part, at the time of a foaming and a molding of the above sole, a vulcanized rubber material is often disposed into a mold, and then integrally molded with a foaming molded sole. But this method is disadvantageous in that such a foaming molded shoe shows a less adhesion between a vulcanized rubber and a semihard polyurethane, and has a low durability of a sole.

In order to improve an adhesion of a vulcanized rubber base to a semihard polyurethane, a synthetic resin article and the like of a shoe upper material, there has been carried out such a complicated process that a surface to be adhered of a vulcanized rubber base is buffed to become rough, subjected to chlorination treatment and treatment with an acryl-modified polyurethane type primer, and then coated with a polyurethane type adhesive etc. followed by disposing them within a mold to inject a semihard polyurethane or other synthetic resin articles etc. However, since an adhesion surface of a rubber base used in a sole is not smooth or a base is a thin sheet or small piece, it is difficult to perform a buffing of an adhesion surface before adhesion and roughing can not be performed evenly.

When such a known shoe article is subjected to flexing fatigue, it often occures a peeling between a vulcanized rubber layer and a synthetic resin article such as a semihard polyurethane layer or a shoe upper material because various pretreatments before an adhesion treatment and a coating of an adhesive can not be effected uniformly.

In order to improve a peeling strength between a synthetic resin layer such as polyurethane and a vulcanized rubber base, it has been proposed to insert a thermal crosslinking adhesive layer between a layer of a synthetic resin such as polyurethane and a vulcanized rubber base, and compress with heating to integrate them (Japanese Laid Open Patent Publication No. 8241/1981). In such a method, however, when a thermal crosslinking adhesive composition is coated onto a polyurethane film formed on a mold releasing agent to dispose it into a mold and an unvulcanized rubber mass is placed thereon before molding by thermal compress at high temperature and under high pressure, there is such a defect that an intermediate adhesive composition is uneven in the bulk, or that air bought in a mold or a volatile matter produced from a rubber compound in a vulcanization process causes partial poor condition in adhesion.

OBJECT OF THE INVENTION

It has been requested in this field to eliminate a conventional complicated pre-adhesion treatment process between a vulcanized rubber base and a synthetic resin article such as a semihard polyurethane or the like, and further to improve a bonding strength.

Accordingly, it is an object of the present invention to simplify a process for production of a sole and to improve a bonding strength between a vulcanized rubber base and a synthetic resin foaming layer during an integrally molding of a vulcanized rubber base with a fibrous non-woven fabric or a non-woven fabric impregnated with a synthetic resin such as a thermoplastic polyurethane, or a synthetic resin article such as semihard foaming polyurethane.

It is another object of the present invention to provide a vulcanized rubber article for production of shoes and the method therefor which can be employed in the production of shoes having an excellent flexural fatigue resistance and being comfortable to wear without preventing a flexibility of a foaming synthesis resin sole.

SUMMARY OF THE INVENTION

According to the present invention, there is provided a vulcanized rubber article which comprises a vulcanized rubber layer, and non-porous and homogenized thermoplastic polyurethane layer(s) having an average thickness of 0.02–1.0 mm on at least one surface of the vulcanized rubber layer, said polyurethane layer(s) being integrally fused to the vulcanized rubber and the peeling strength between the rubber layer and the polyurethane layer being at least 1.2 kg/cm.

According to the present invention, there is also provided a process for production of a vulcanized rubber article which comprises:

charging an unvulcanized rubber into a mold for forming, charging a porous film of a thermoplastic polyurethane onto at least one surface of the unvulcanized rubber, said polyurethane having 30 to 100° C. higher melting point than the vulcanization temperature of the rubber and having a substantial gas permeability, and then subjecting to pressure molding with fusion and vulcanization for a vulcanization time ($T_2$ min.) of one to four times of a curing time ($T_1$ min) to give a vulcanized rubber article, wherein a thin layer of the thermoplastic polyurethane film, which has lost pores by fusion and has an average thickness of 0.02 to 1.0 mm, being integrally laminated on at least one surface of a layer of the vulcanized rubber, and the peeling strength between the rubber layer and the polyurethane thin layer being at least 1.2 kg/cm.

The vulcanized rubber article of the present invention has an excellent adhesion to other material and provide remarkably excellent fabricated articles.

DETAILED DESCRIPTION OF THE INVENTION

Figure 1:
FIG. 1 is a schematic cross section of a vulcanized rubber article of the present invention.

The rubber used in the present invention is that usually applied in shoes or other molding material similar to shoes material, and is at least one unvulcanized rubber selected from the group consisting of a natural rubber and synthetic rubbers such as styrene-butadiene copolymer (SBR), acrylonitrile-butadiene copolymer (NBR), isoprene rubber (IR), butadiene rubber (BR) and the like.

The rubber is preferably used in the form of an unvulcanized rubber composition which contains calcium carbonate; calcium carbonate or magnesium carbonate treated with silane or a fatty acid; hydrated silicates such as aluminum silicate; filler such as titanium oxide, zinc oxide; a crosslinking agent (ion), an anti-oxidant, a softening agent, a pigment and the like. The content of the rubber in the unvulcanized rubber composition is in the range of 20 to 90 wt. %. In order to obtain an excellent adhesion of the rubber with a thermoplastic polyurethane, the content can be varied depending upon a particular kind of the rubber. For example, it is effective to use the rubber content of 30 to 85 wt. % for natural rubber, and of not more than 50 wt. % for SBR.

Further, since the kind and the content of a filler also effects on the adhesion of the rubber, it is preferable to set a formulation of the composition and molding conditions of the rubber so that a peeling strength between the polyurethane thin layer and a vulcanized rubber layer is at least 1.2 kg/cm by experimentally confirmation of the adhesion between the layers prior to blending a particular filler into the rubber.

The porous thermoplastic polyurethane film which is laminated onto the unvulcanized rubber composition in the present invention has 250 kg. %/2.5 cm of a toughness measured according to Japanese Industrial Standards (JIS) L-1096, not more than 500 min/100 cc, preferably not more than 200 min/100 cc of a gas permeability measured by a B type Gurley Densometer as defined in JIS P-8111, and 0.02 to 1.00 mm, preferably 0.05 to 0.5 mm of a thickness of the formed polyurethane thin layer.

The polyurethane has preferably a melting point of not less than about 160° C., more preferably 180° C. to 240° C. which is over 30 ° C. higher, preferably 30 to 100° C. higher than vulcanization and molding temperature because the polyurethane is required to stand conditions of vulcanization and molding which require high temperature and high pressure.

The thermoplastic polyurethane used in the present invention is obtained by reacting a polymer glycol having an average molecular weight of 500–3000, an organic polyisocyanate and a chain extender as main ingredients in a desired ratio. These ingredients are as follows:

. (1) Polymer glycol

The polymer glycols usually employed in the present invention are polyester glycols, polyether glycols, polycarbonate glycols and the like, or the mixture thereof.

Suitable examples of the polyester diol are polyethyleneadipate glycol, polyethylenepropyleneadipate glycol, polybutyleneadipate glycol, polyhexamethyleneadipate glycol, polycaprolactone glycol and the like.

Suitable examples of the polyether diols are polyethylene ether glycol, polypropylene ether glycol, polytetramethylene ether glycol, polyhexamethylene ether glycol, polyethylenepropylene ether glycol, and the like.

Suitable examples of the polycarbonate glycol are an aliphatic polycarbonate glycol represented by 1,6-hexanediol polycarbonate and aromatic ring containing polycarbonate glycol.

(2) Organic polyisocyanate

The organic polyisocyanates used in the present invention are tolylene diisocyanate, diphenyl diisocyanate, diphenylmethane 4,4'-diisocyanate, xylylene diisocyanate, naphtylene diisocyanate, dicyclohexylmethane 4,4'-diisocyanate, dicyclohexyl diisocyanate, hexamethylene diisocyanate, isophorone diisocyanate, and the like. The polyisocyanate can be used alone or in combination of two or more thereof.

(3) Chain extender

The chain extenders use in the present invention are a low molecular weight diol having two active hydrogen atmos, low molecular weight diamine, low molecular weight hydroxy amine and the like. The chain extender can be also used alone or in combination of two or more thereof.

In order to produce the polyurethane, any conventional method can be employed in the present invention.

The production may be carried out in one or more solvents selected from the group consisting of dimethylformamide, diethylformamide, dimethylsulfoxide, dimethylacetamide, tetrahydrofuran, and the like.

The particularly suitable thermoplastic polyurethane used in the present invention includes a thermoplastic polyurethane obtained from a polymer glycol (i.e. soft segment) containing a polyether diol segment in a range of not less than 15 wt. %, preferably not less than 25 wt. %. Such polyurethane has a good developing property under melting conditions when it is vulcanized to mold with the unvulcanized rubber. Further, by using of such polyurethane, the vulcanized and integrally fused rubber article has a high peeling strength between the polyurethane thin layer(s) and the vulcanized rubber layer and has an excellent flexural fatigue resistance. Therefore, the present vulcanized rubber article is advantageously used in a base for a sole.

The porous film of the thermoplastic polyurethane used in the present invention is obtained by casting a solution or dispersion of the polyurethane, or a liquid composition of the polyurethane containing a foaming agent, a coagulation regulator etc. onto a support and subjecting to dry-heat coagulation or wet coagulation.

Some of porous polyurethane films have a substantial gas permeability. On the other hand some of those have poor or no gas permeability even though they have fine porous structure because of a coagulation method or conditions, or characteristics of a polyurethane.

The former porous polyurethane can be used as it is in the present invention. The latter film must be, however, provided with gas permeable holes through needle punching, discharge piercing treatment, plasma treatment and the like, to form a porous film having a substantial gas permeability.

Alternatively, the porous film can be obtained by forming a membrane of a composition of the polyurethane containing a fine material which can dissolue by the non-solvent of the polyurethne, and then subjecting the resulting membrane to eluation treatment to elute the fine material.

Further, the porous film having a substantial gas permeability can be also obtained by subjecting a polyurethane film, which is produced through a method providing no porosity such as a membrane producing method by melting, to needle punching, discharge piercing treatment, plasma treatment and the like.

The gas permeability of the porous film is substantially varied due to production conditions of the polyurethane film, piercing conditions and the like. The polyurethane has preferably a substantial permeability as defined in JIS P-8111 of not more than 500 minutes/100 cc, more preferably not more than 200 minutes/100 cc. The porous polyurethane film having the above gas permeability can sufficiently purge the air in a mold or a volatile matter produced during the vulcanization and the molding of an unvulcanized rubber so that the vulcanized rubber layer is in contact and integral with the polyurethane thin layer, and hence, these layers show a high peeling strength therebetween.

Further, the porous film of the thermoplastic polyurethane has preferably a toughness of at least 250 kg. %/2.5 cm because it is needed to maintain a predetermined shape in the mold during lamination onto the vulcanized rubber and molding by heat and pressure, with resisting a developing force of the unvulcanized rubber at least in an early stage.

According to the present invention, the unvulcanized rubber composition and the thermoplastic polyurethane porous film are laminated prior to vulcanization and molding, the conditions of which are varied depending on a kind and a composition of the rubber, vulcanization temperature, desired shape and the like. The vulcanization is performed generally at a vulcanization temperature of 140 to 180° C. under a pressure on the surface of mold of 20 to 100 kg/cm$^2$, preferably 30 to 60 kg/cm$^2$.

According to the present invention, the vulcanization is carried out under the conditions of $T_2=T_1$ to $4T_1$, wherein $T_1$ (min.) is a curing time of the polyurethane on a predetermined vulcanization temperature for the rubber and $T_2$ (min.) is a time for completion of vulcanization and molding.

When the time $T_2$ is too short, the adhesion between the rubber layer and the polyurethane thin layer is not sufficiently improved, on the other hand, when such time is too long, it induces a degradation of the polyurethane and the like to decrease the adhesion between the polyurethane and the other material, even though the adhesion between the rubber layer and the polyurethane thin layer is sufficient.

In the beginning of the vulcanization step, the unvulcanized rubber composition flows in a molten state within the mold, and the holes for gas permiability in the porous polyurethane film allows to purge the air in the mold and the volatile matter in the rubber composition.

As the vulcanization of the rubber proceeds, the polyurethane film also becomes a molten state and flows so that it becomes a non-porous polyurethane thin layer through crushing of the porous or holey structure of the polyurethane.

The vulcanized rubber article obtained in the present invention can be used for various final products by adhesion it to other desired materials such as synthetic resin articles, cloths, leathers and the like.

The vulcanized rubber articles produced by the method of the present invention has a sufficiently improved peeling strength between the vulcanized rubber layer and the polyurethane thin layer of at least 1.2 kg/cm, or at least 2.5 kg/cm for a sole.

The present invention is further illustrated by the following embodiment in detail with referring to the accompany drawings.

FIG. 1 illustrates a schematic cross section of an embodiment of the vulcanized rubber article in the present invention, wherein the vulcanized rubber layer 1 and the polyurethane thin layer 2 are fused to each other to form integrated layers.

Figure 2:
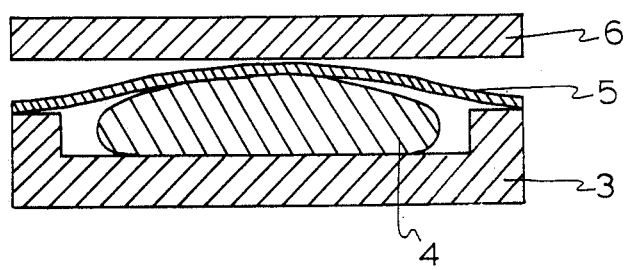
FIGS. 2 and 3 are schematic cross sections of embodiments of a mold for production of the present vulcanized rubber article.

FIG. 2 shows the method for production of the vulcanized rubber article shown in FIG. 1, which is obtained by incorporation of the polyurethane thin layer onto one surface of the rubber layer. Referring to the FIG. 2, into a heated mold (female) 3, a bulk of the vulcanized rubber composition 4 is charged, on which the porous film 5 of the thermoplastic polyurethane is disposed. Then, the mold (male) 6 is set, and compressing are carried out to vulcanize the rubber layer and to fuse-integrate the rubber layer with the polyurethane layer.

Figure 3:
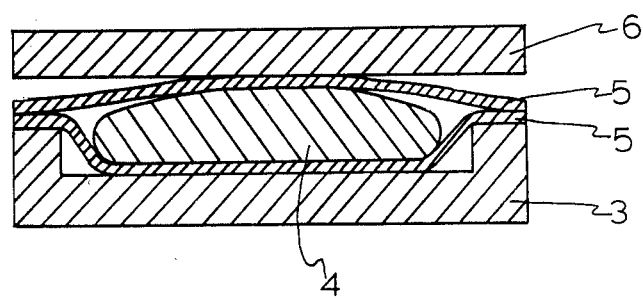

FIG. 3 shows the method for the production of the vulcanized rubber article which was obtained by integration of the polyurethane thin layer with the upper and lower surfaces of the vulcanized rubber. Referring to the FIG. 3, the bulk 4 of the unvulcanized rubber is charged between the porous films (5,5') of the thermoplastic polyurethane to be subjected to heating and compression.

Figure 4:
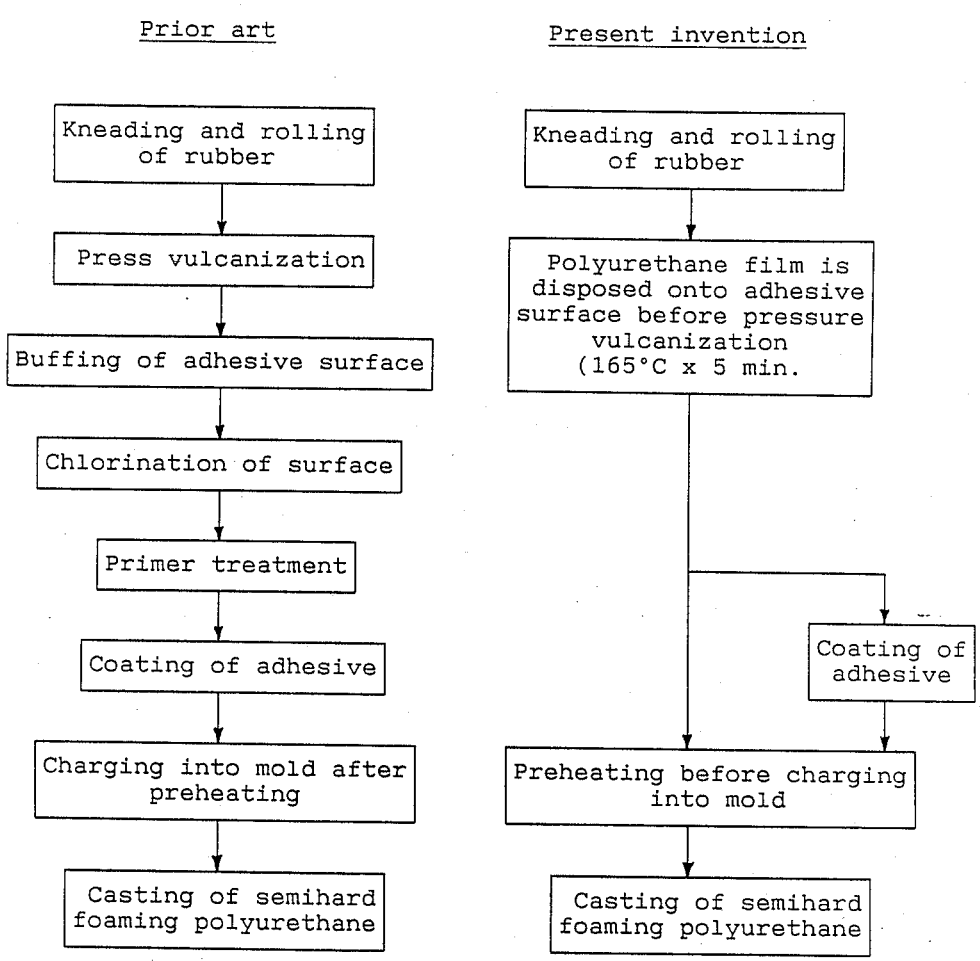
FIG. 4 is a flow sheet illustrating the process for production of a sole according to the present invention in comparison with that of the prior art.

FIG. 4 is a flow-chart illustrating the process for production of the sole according to the present invention in comparison with that of the prior arts.

The vulcanized rubber article of the present invention, wherein a thermoplastic polyurethane thin layer is fused to and integrated with at least one surface of the vulcanized rubber layer, simplifies a shoe making process that integrates a rubber article with a semihard foaming polyurethane layer into a sole, adheres it to a shoe upper material and the like. According to the present invention, the process for the production of shoes can be readily controlled and the resulting articles have an excellent adhesion to a sole and a shoe upper material, and an excellent flexibility and flexing resistance.

The present vulcanized rubber article can be applied in a belt, a hose, cloths with rubber backing and the like, and is effectively adhered to a natural leather or a synthetic leather. Thus obtained fabricated articles have an excellent friction resistance, oil resistance, cleavage resistance against ozone.

The present invention is illustrated by the following Examples but should be construed to be limited thereto. In Examples, the various properties were measured in the following methods.

(1) Gas permeability

It was measured with a B Gurly type Densometer by the method defined as JIS P 8111.

(2) Toughness

It was determined as a product of a tensile strength and an elongation of a sample having a width of 2.5 cm, which are measure by the method defined as JIS L 1096.

(3) Peeling strength

It was determined as a product of a peeling strength of a sample having a width of 2.5 cm, which are measure by the method defined as JIS K 6301.

In Examples, polyols, polyisocyanates and chain extenders of the raw material, and a solvent are referred to the following shortening.

| Shortening | Compound |
| --- | --- |
| PCL | Polycaprolactone glycol |
| PTMG | Polytetramethylene ether glycol |
| MDI | p,p'-Diphenylmethane diisocyanate |
| EG | Ethylene glycol |
| DMF | Dimethylformamide |

PREPARATION OF THE POROUS THERMOPLASTIC POLYURETHANE FILM

(a) Type A

A PCL having an average molecular weight of 2000 was reacted with MDI and EG as a chain extender to give a polyester type polyurethane. The resulting polyurethane was dissolved into DMF as a solvent to give a solution of polyurethane (15 wt. %) in DMF containing a regulating agent for a porous structure. The solution was casted onto a polyethylene sheet, and dipped into an aqueous DMF solution to be subjected to wet-coagulation. Then, the resulting porous polyurethane film was washed and dried to give a film which has a weight of 72 g/m$^2$, a thickness of 0.34 mm and an apparent density of 0.21 g/cm$^3$. The polyurethane film has a porous structure wherein the most pores are elongate in the direction of the thickness of the film and the pores penetrate the film from the one surface to the another.

(b) Type B

In the same manner as described in the above (a), a PCL having an average molecular weight of 2100 was reacted with MDI and EG to give a polyester type polyurethane, which was dissolved into DMF. The solution was casted onto a polyethylene sheet, and dipped into an aqueous DMF solution to be subjected to wet-coagulation. Then, the resulting polyurethane film was washed and dried to give a film which has a weight of 88 g/m$^2$, a thickness of 0.33 mm and an apparent density of 0.27 g/cm$^3$. The polyurethane film has a porous structure and a skin layer at the surface of the film.

(c) Type C

A PTMG having an average molecular weight of 1000 was reacted with MDI and EG to give a polyether type polyurethane. The resulting polyether type polyurethane (30 wt. %) and the Type A polyester type polyurethane (70 wt. %) were mixed to give a solution of polyurethane (20 wt. %) in DMF. The solution was casted onto a polyurethane sheet, and dipped into an aqueous DMF solution to be subjected to wet-coagulation. Then, the resulting polyurethane film was washed and dried to give a film which has a weight of 129 g/m$^2$, a thickness of 0.28 mm and an apparent density of 0.46 g/cm$^3$. The resulting polyurethane film has a porous structure and a skin layer at the surface of the film.

(c) Type D

A PTMG having an average molecular weight of 1000 was reacted with MDI and EG to give a polyether type polyurethane. The solution of the polyurethane (18 wt. %) in DMF was casted onto a polyethylene sheet, and dipped into an aqueous DMF solution to be subjected to wet-coagulation. Then, the resulting polyurethane film was washed and dried to give a film which has a weight of 79 g/m$^2$, a thickness of 0.22 mm and an apparent density of 0.36 g/cm$^3$. The resulting polyurethane film has a porous structure having a relatively thin skin layer and inner elongate pores in the direction of the thickness of the film.

The properties of the resulting porous film are shown in Table 1.

TABLE 1

| Type of film | Melting point (°C.) | Weight (g/m$^2$) | Gas permeability (sec/100 cc) | Toughness (kg. %/2.5 cm) |
| --- | --- | --- | --- | --- |
| A | 228 | 72 | 2–3 | 450 |
| B | 225 | 88 | 60 | 590 |
| C | 226 | 129 | 300 | 4400 |
| D | 223 | 79 | 200 | 440 |

PREPARATION OF THE RUBBER COMPOSITION

The rubber composition having a curing time of 4 minutes at 165° C. is as follows:

| Rubber composition | parts by weight |
| --- | --- |
| Natural rubber | 50,000 |
| Butadiene rubber | 25,000 |
| Styrene-butadiene rubber | 25,000 |
| Sulfer | 1,700 |
| Zinc oxide | 5,000 |
| Stearic acid | 1,000 |
| Vulcanization accelerator | 1,550 |
| White carbon | 50,000 |
| Active agent | 3,500 |
| Anti-ageing agent | 1,000 |
| Calcium carbonate | 15,000 |
| Titanium oxide | 6,000 |
| Total | 184,750 |
| (content of rubbers 54.1%) | |

EXAMPLES 1 TO 8 AND REFERENCE EXAMPLES 1 TO 4

In the manner as shown in FIG. 2, such rubber composition and the above described porous polyurethane film were vulcanized and molded at a temperature of 165° C. under a molding pressure of 50 kg/cm$^2$ for various predetermined time in Table 2. The following Table 2 shows the relation between the vulcanization-molding time and the peeling strength of the rubber layer—the polyurethane thin layer.

TABLE 2

| No. | Polyurethane film | Thickness of the polyurethane layer in article (mm) | Time of vulcanization and molding (min.) | Peeling strength (kg/cm) |
| --- | --- | --- | --- | --- |
| Ref Ex 1 | Type A | ca. 0.070 | 3 | 0.5 |
| EX 1 | " | ca. 0.063 | 5 | 1.2 |
| EX 2 | " | " | 7 | 1.4 |
| Ref Ex 2 | Type B | ca. 0.082 | 3 | 0.6 |
| EX 3 | " | ca. 0.077 | 5 | 1.7 |
| EX 4 | " | " | 7 | 2.0 |
| Ref Ex 3 | Type C | ca. 0.120 | 3 | 0.6 |
| EX 5 | " | ca. 0.113 | 5 | 3.0 |
| EX 6 | " | " | 7 | 3.2 |
| Ref Ex 4 | Type D | ca. 0.073 | 3 | 0.7 |
| EX 7 | " | ca. 0.069 | 5 | 3.0 |

TABLE 2-continued

| No. | Poly-urethane film | Thickness of the polyurethane layer in article (mm) | Time of vulcanization and molding (min.) | Peeling strength (kg/cm) |
| --- | --- | --- | --- | --- |
| EX 8 | " | " | 7 | 3.4 |

The resulting vulcanized rubber articles have a thickness of about 6 mm. The articles of the Reference Examples 1-4 have a remained pores and holes in a polyurethane thin layer and have parts being completely non-porous. Further, in the articles of the Reference Examples, the vulcanization was not perfected so that a peeling strength between the rubber layer and the polyurethane thin layer was not sufficiently improved.

EXAMPLES 9-13

Using various rubber contents in the rubber composition in the following table, Type C microporous polyurethane film (weight: 84 g/m$^2$; thickness: 0.18 mm; apparent density: 0.47 g/cm$^3$) was vulcanized and molded at a temperature of 165° C. for 5 minutes under the molding pressure of 50 kg/cm$^2$ to give vulcanized rubber articles. The articles has a thickness of 6 mm, a thickness of the polyurethane thin layer of about 0.074 mm and an excellent peeling strength shown in Table 3.

PREPARATION OF THE RUBBER COMPOSITION

| Preparation | Content of rubber | | |
| --- | --- | --- | --- |
| | 25% | 50% | 75% |
| Rubber(polymer) | 100 parts | 100 parts | 100 parts |
| Sulfur | 1.9 parts | 1.9 parts | 1.9 parts |
| Zinc oxide | 5 parts | 5 parts | 5 parts |
| Stearic acid | 1 parts | 1 parts | 1 parts |
| Vulcanization accelerator | 1.5 parts | 1.5 parts | 1.5 parts |
| Calcium carbonate | 291 parts | 91 parts | 24 parts |

TABLE 3

| NO. | Rubber (polymer) | Peeling strength (kg/cm) | | |
| --- | --- | --- | --- | --- |
| | | Rubber content 25% | Rubber content 50% | Rubber content 75% |
| Ex. 9 | NR | 4.0 | 4.0 | 4.0 |
| Ex. 10 | SBR | " | 3.0 | 1.5 |
| Ex. 11 | IR | " | 4.0 | 4.0 |
| Ex. 12 | BR | " | " | 2.5 |
| Ex. 13 | NBR | " | " | 4.0 |

EXAMPLE 14

The contacting parts of a sole to the ground was produced in the same manner as described in the vulcanized rubber article of Example 5. The resulting parts were preheated, and then charged into an injection mold for a sole with an upward polyurethane thin layer. A semihard foaming polyurethane, which was obtained from butyleneadipate type polyester polyol, 1,4-butanediol and MDI, was then charged into the mold to form a sole. A condition of injection molding includes a cream time of 8 seconds, raise time of 43 seconds, curing time of 5 minutes and molding temperature of 45° C. The resulting sole has a peeling strength between the vulcanized rubber layer and the foaming polyurethane layer of 3.0±0.5 kg/cm, and has an excellent durability.

To compare with the article in this Example 14, a vulcanized rubber article obtained in the same manner as described in Example 5 except the vulcanizing and molding time of 20 minutes as long treatment, was molded into a sole in the same conditions as described above. The resulting sole article has a peeling strength between the semihard polyurethane and the rubber layer of 1.8 kg/cm, and has an insufficient adhesion as a sole.

EXAMPLE 15

A contacting parts of a sole to the ground, which is obtained in the same manner as described in Example 14, was spread with an acrylic modified polyurethane adhesive onto the surface of the polyurethane thin layer and charged into a mold. Then, into the mold, polyvinyl chloride composition (polyvinyl chloride (P 1000): 100 parts, plasticizer DOP: 90 parts; stabilizer: sufficiency; calcium carbonate: 10 parts) was poured and molded into a sole by injection. The resulting sole has a peeling strength between the vulcanized rubber layer and the polyvinyl chloride of 4.0 kg/cm and an excellent adhesion.

EXAMPLE 16

Various materials are adhered onto the polyurethane thin layer of the vulcanized rubber article produced in Example 5 by a polyurethane type adhesive, which peeling strengths were measured. The results are shown in Table 4. For comparison, a peeling strength of an article produced by the prior process is also shown in the same Table.

TABLE 4

| Material to be adhered | Prior process (kg/cm) | Present process (kg/cm) |
| --- | --- | --- |
| Cotton cloth | 4.0-6.0 | 3.5-5.0 |
| Natural leather | Break of material to be adhered | Break of material to be adhered |
| Synthetic leather | Break of material to be adhered | Break of material to be adhered |

Even though the process is simplified, the sole article of the present invention has an equivalent peeling strength to that of the prior art.

EXAMPLE 17

A friction resistance (strength), oil resistance and cleavage resistance against ozone of the surface of the vulcanized rubber article in Example 5 were measured. They were measured under the following conditions:

(a) Friction resistance

It was measured through an Akron type abrader under the condition of 6 lbs. × 1000 times.

(b) Oil resistance

It was measured after a sample was treated at 40° C. for 22 hrs. with the NO. 2 oil as defined in Japanese Industrial Standards (JIS).

(c) Cleavage resistance to ozone

It was measured through an ozone tester under an ozone concentration of 50 ppm with 10% elongation of a sample. The excellent results are shown in Table 5.

TABLE 5

| Test item | Surface of vulcanized rubber | Surface of polyurethane film adhered |
| --- | --- | --- |
| Friction resistance | 0.10 cc | 0.01 cc |
| Oil resistance | +12% | +3% |
| Cleavage resistance to ozone | Cleavage after 3 hours | No cleavage for over 96 hours |

EXAMPLE 18

The Type C film of Example 5 was punching by needles every 2 mm. The resulting punched film has a gas permeability of 7 sec/100 cc and toughness of 3600 kg. %/2.5 cm. In the same manner as described in Example 5, the punched film was subjected to vulcanization and molding for 5 minutes to give a vulcanized rubber article. The resulting article has a peeling strength between the rubber layer and the polyurethane thin layer of 3.1 kg/cm.

The type C polyurethane solution in DMF was casted onto a polyethylene sheet and the solvent was evaporated in a dryer to give non-porous polyurethane film having a thickness of 0.08 mm. The polyurethane film was punched by needles every 2 mm to make penetrating holes. The resulting holey film has a gas permeability of 12 sec/100 cc and toughness of 4480 kg. %/2.5 cm.

The holey polyurethane film and the rubber compound having the same composition as that of Example 5 were vulcanized and molded at a temperature of 140° C. for 11 minutes to give a vulcanized rubber article having a peeling strength between the vulcanized rubber layer and the polyurethane thin layer of 1.5 kg/cm. On the other hand, in the same manner as described above, except that the treatment was carried out at a temperature of 165° C. for 5 minute, the polyurethane film and the rubber compound were treated to give a vulcanized rubber article having a peeling strength between the vulcanized rubber layer and the polyurethane thin layer of 2.0 kg/cm.

REFERENCE EXAMPLE 5

In the same manner as described in Example 19 except that a non-porous polyurethane film was not punched, a vulcanized rubber article was produced. The peeling strengths between the vulcanized rubber layer and the polyurethane thin layer of the resulting article were 0.4 kg/cm for a vulcanization temperature of 140° C. and 0.6 kg/cm for a vulcanization temperature of 165° C. Both articles remains bubbles which are not purged from between a vulcanized rubber layer and a polyurethane thin layer, and shows an inferior parts in adhesion.

What is claimed is:

1. A vulcanized rubber article which comprises a vulcanized rubber layer, and non-porous and homogenized thermoplastic polyurethane layer(s) having an average thickness of 0.02–1.0 mm on at least one surface of the vulcanized rubber layer, said polyurethane layer(s) being integrally fused to the vulcanized rubber without an adhesive, and the peeling strength between the rubber layers and the polyurethane layer being at least 1.2 kg/cm, the surface of said polyurethane layer of the vulcanized rubber article being fused or adhered to a synthetic resin article, cloth article or leather article.

2. A vulcanized rubber article according to claim 1, wherein a soft segment constituting the thermoplastic polyurethane contains at least 15% by weight of a polyether ingredient selected from the group consisting of polypropylene ether, polytetramethylene ether, polyhexamethylene ether and polyethylenepropylene ether.

* * * * *